May 31, 1966   G. C. McNABB   3,253,460
FORCE BALANCE MEASURING APPARATUS
Filed Sept. 20, 1963   3 Sheets-Sheet 1
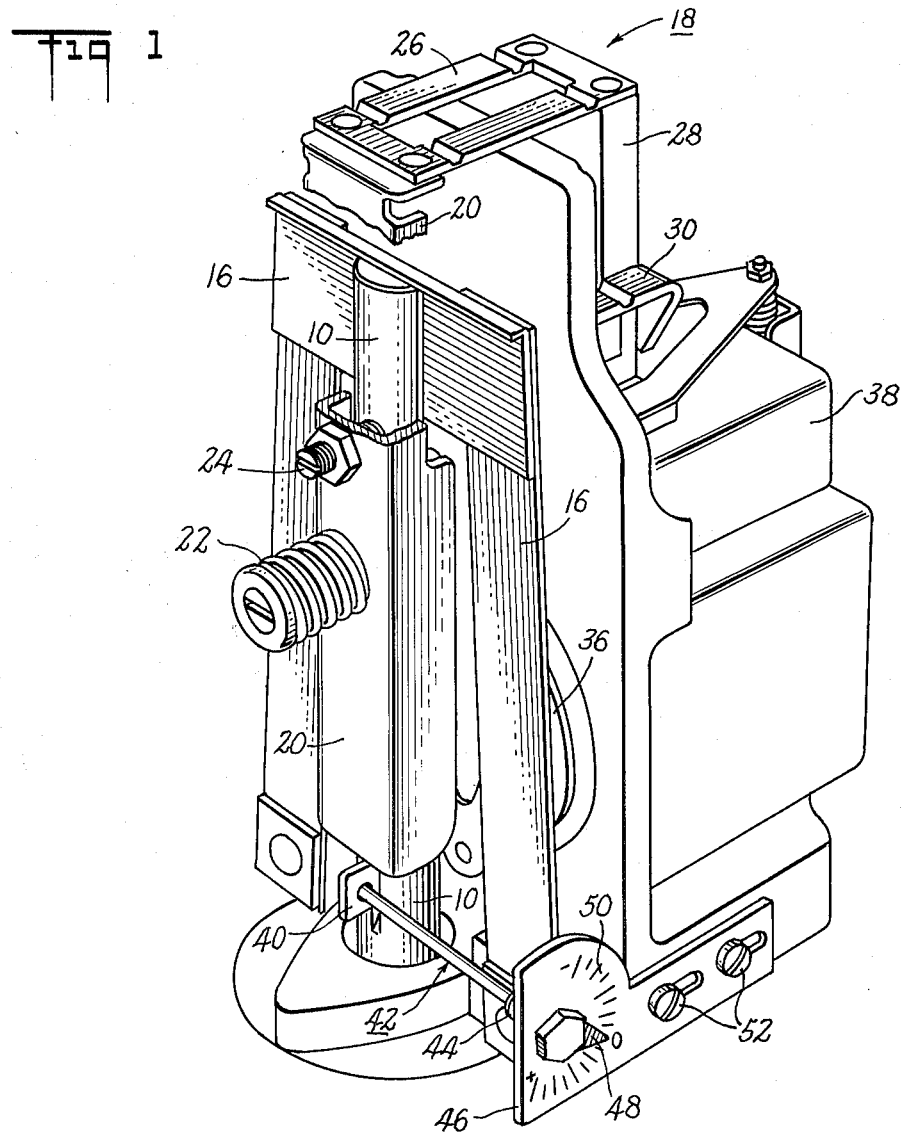
INVENTOR
George C. McNabb
BY
Curtis Morris & Safford
ATTORNEYS

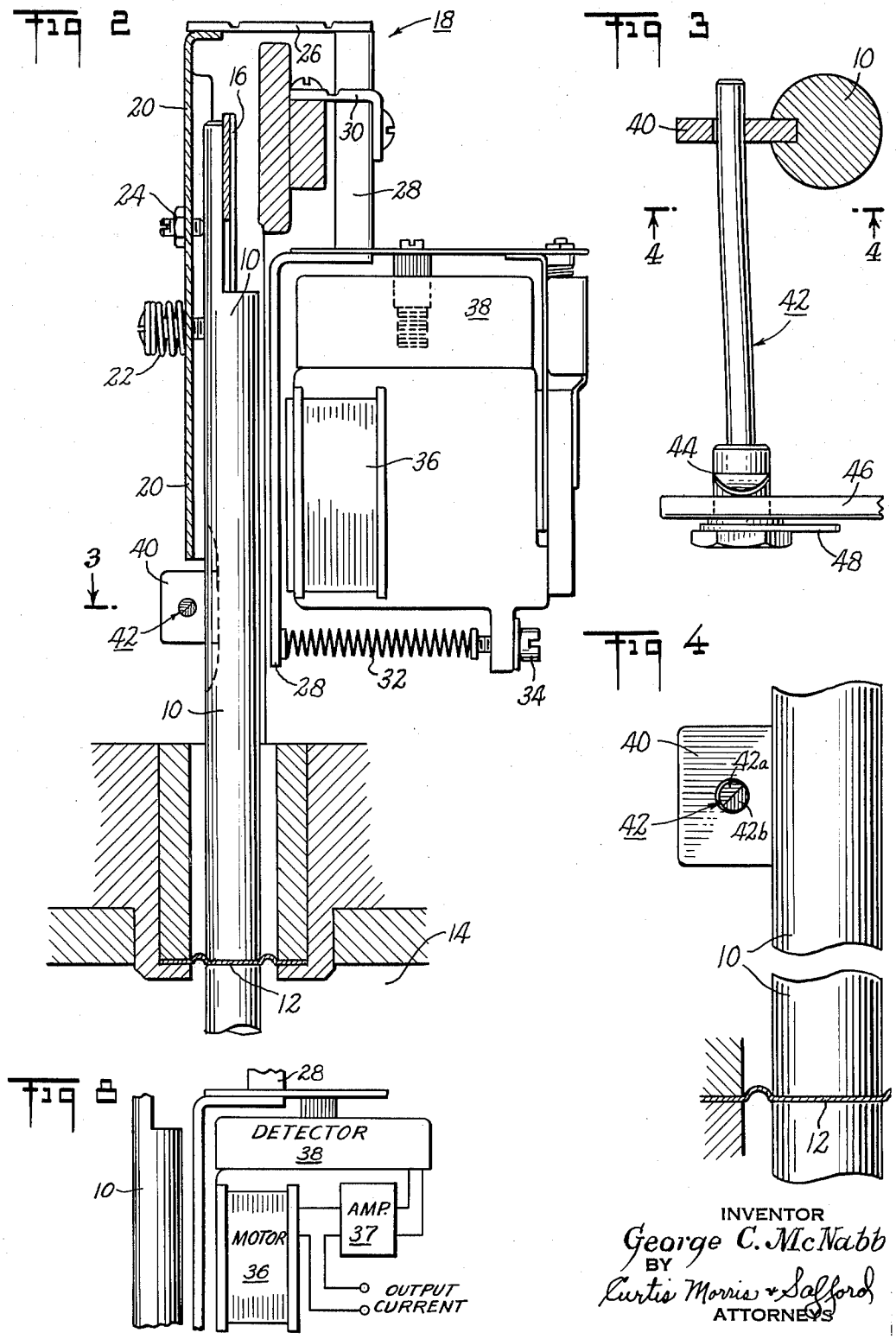

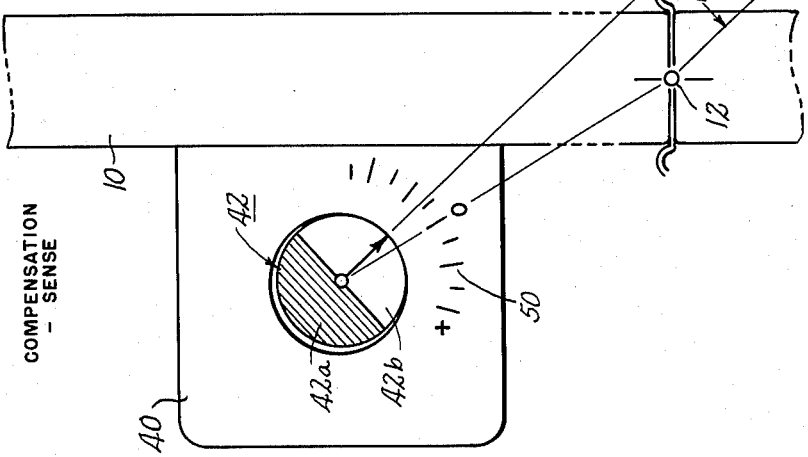
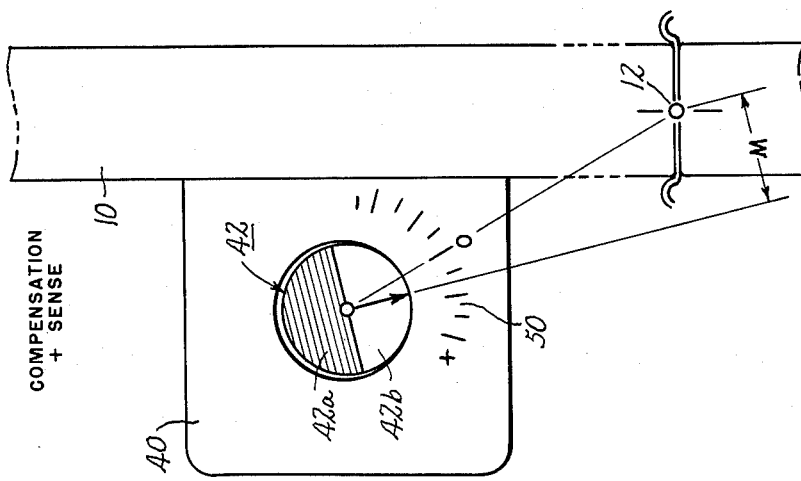
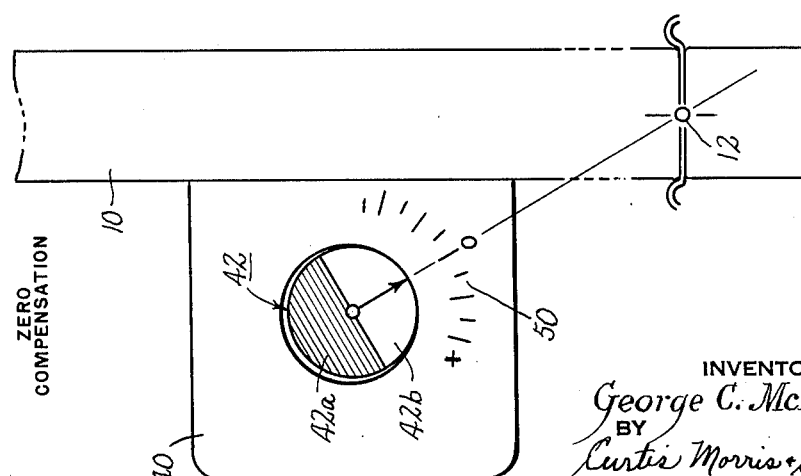

United States Patent Office 3,253,460
Patented May 31, 1966

3,253,460
FORCE BALANCE MEASURING APPARATUS
George C. McNabb, Attleboro, Mass., assignor to The Foxboro Company, Foxboro, Mass.
Filed Sept. 20, 1963, Ser. No. 310,199
6 Claims. (Cl. 73—141)

This invention relates to force-balance measuring apparatus, for example, a differential-pressure instrument arranged to produce a signal corresponding to the flow rate of a fluid. More in particular, this invention relates to improved means in such apparatus for minimizing errors resulting from changes in ambient temperature.

Force-balance instruments have been widely used by industry for many years in a variety of measuring instruments. One important application of this principle has been in differential-pressure flow transmitters, e.g. as shown in Olsen Patent 2,956,212. In such instruments, there is an elongated "force-bar" which is pivoted about a transverse axis. An input force corresponding to the fluid flow rate is applied to this force-bar to produce a torque about the pivot axis, and a rebalance torque is applied to tend to hold the force-bar motionless. This rebalance torque is developed by a negative feedback arrangement which senses any slight change in position of the force-bar due to an unbalance of torques, and directs a corresponding feedback signal to a motor which applies to the force-bar a force in opposition to the input force. Thus, the feedback signal is maintained proportional to the fluid flow rate being measured, and therefore this feedback signal is used to develop an output signal for transmission to a remote control station or indicating device.

In a force-balance instrument, there is virtually no movement of the force-bar over the full-scale range of operation. This is advantageous because it effectively eliminates hysteresis errors and the like which occur in so-called motion-balance instruments. However, since the means used to detect any unbalance in a force-balance instrument must be quite sensitive to very tiny movements of the force-bar, it follows that this instrument also will be sufficiently sensitive to detect the rather small physical deflections caused by expansion or contraction of parts with changes in ambient temperature. In other words, a moderate change in ambient temperature can cause a significant error in the output signal.

In the past, such temperature errors have been minimized by various techniques including careful design and selection of materials, and the use of a feedback motor of substantial power capable of masking out moderate temperature effects. However, these prior techniques have not afforded a fully satisfactory solution to the problem. This is particularly the case in force-balance instruments of the type which produce an electrical output signal, primarily because there are practical difficulties which prevent the use of an electrically-operated motor capable of developing a large amount of feedback force on the force-bar.

Accordingly, it is an object of this invention to provide an improved force-balance instrument. It is a more specific object of this invention to provide such an instrument having significantly reduced errors due to ambient temperature changes. Other objects, aspects and advantages of this invention will in part be apparent from, and in part pointed out in, the following description of a preferred embodiment of the invention, considered together with the accompanying drawings, in which:

FIGURE 1 is a perspective view showing a force-balance instrument constructed in accordance with the present invention;

FIGURE 2 is a vertical section showing schematically the principal components of the force-balance instrument of FIGURE 1;

FIGURE 3 is a detail plan view of the bimetallic temperature-compensating element;

FIGURE 4 is a cross-section taken along line 4—4 of FIGURE 3;

FIGURES 5 through 7 illustrate diagrammatically the manner in which the bimetallic element provides the required compensation effect for different circumstances; and FIGURE 8 is a diagrammatical showing of the electrical circuit interconnecting the detector and motor components.

Referring first to FIGURES 1 and 2, the instrument includes a vertical force-bar 10 to which is secured a diaphragm 12 arranged to accommodate pivotal movement of the force-bar about a horizontal axis. The lower end of this force-bar extends into an input chamber generally indicated at 14 (see also the above-mentioned Olsen Patent 2,956,212) where it receives a measurement force developed by any conventional condition-sensing means (not shown herein) such as a differential-pressure capsule diaphragm assembly, or a target disposed in a stream of flowing fluid. The diaphragm 12 serves as a pressure seal between the input chamber of the instrument and atmospheric pressure.

Because the pressure in the input chamber 14 typically is very high, e.g. as high as 1500 p.s.i., the force exerted upwards on the force-bar 10 can be considerable. For that reason, the usual A-shaped flexure assembly 16 is connected between the top of the force-bar and the chassis of the instrument. This flexure is aligned with the longitudinal axis of the force-bar, and prevents axial movement of this bar while permitting free pivotal movement thereof about the sealing diaphragm 12.

Engaged with the force bar 10 near the top thereof is a force-transmitting linkage generally indicated at 18. This linkage includes a first vertical arm 20 which is fastened to force-bar 10 by a coupling including an overload spring 22. The spacing between arm 20 and force-bar 10 is fixed by an adjustable set-screw 24. A horizontal cross-link 26 connects the top of arm 20 to the top of a second vertical arm 28 which is mounted for pivotal movement about a horizontal axis by pivot means 30. The lower end of arm 28 is connected to a zero-set spring 32 which is adjustable by means of a screw 34.

Connected to the lower end of arm 28 is the armature of a rebalance motor 36. This motor preferably is of the type wherein the armature includes a coil of wire positioned in the magnetic field of a permanent magnet, e.g. as in the voice-coil arrangement of some loudspeakers. Such motors are advantageous because the force developed at the armature is quite linearly related to the magnitude of the current flowing through the moving coil.

Also secured to the arm 28 is the sensing element of an unbalance detector generally indicated at 38. This detector may, for example, comprise a magnetic core structure such as shown in the above-mentioned Olsen patent. In that detector, the sensing element consists of a stack of magnetic material adapted to control the coupling between windings on the magnetic core in such a way as to produce an electrical signal the magnitude of which is determined by the positioning of the force-bar. A conventional electronic amplifier 37 (FIGURE 8) also preferably is provided to convert the detector output to a relatively high-powered D.-C. signal, e.g. in the range of 10–50 milliamps, which can serve as the output signal of the transmitter as well as supply the control current for the motor 36.

The force applied to the force-bar 10 by the motor 36 is maintained automatically, by the feedback controlling action of the detector 38, at a value such as to produce a net torque of zero on the force-bar. If the input force changes, e.g. due to a change in the flow rate of the fluid being measured, the torques applied to the force-bar will become unbalanced, and this bar will rock about the pivot axis of the diaphragm. The output signal of the detector 38 will immediately change, thereby altering the current through the motor 36 until the torques are again in balance, at which time the output current (which is the same as the motor current) will again be proportional to the measured process condition.

The "range" of the instrument is adjusted by changing the vertical positioning of the pivot 30, since this will alter the magnitude of current change required to rebalance an input force change. Regardless of the range setting, the amount of movement of the force-bar required to balance the torques is insignificant, e.g. less than one-thousandth of an inch. It is for this reason that such instruments are referred to as force-balance devices.

It will be apparent from the above description and the accompanying drawings that this kind of instrument typically is very complex, and comprises a large number of interconnected parts of various sizes and configurations. Because of this complexity, the expansion or contraction of the various parts due to changes in ambient temperature will generally not be proportionate throughout the structure. Consequently, a change in ambient temperature generally will produce a change in the net torque on the force-bar 10 so as to effect a corresponding change in output current, thus giving the appearance of a variation in the process condition being measured.

Experience has shown that the amount of error in the output signal caused by a given change in ambient temperature differs markedly among instruments of any given type, even among those which are manufactured according to identical designs. For example, the output current of some instruments may increase for a given change in temperature, while for supposedly identical instruments from the same production line, the output current may actually decrease for the same change in temperature. The situation is further complicated by the fact that the magnitude of the error (and sometimes the sign of the error) will generally vary when the range of the instrument is altered, i.e. when the pivot 30 is moved up or down to suit the particular measurement application required. Of course, if the magnitude of the error were small, it would not constitute an important problem. However, the errors encountered in actual practice have been considerable, often reaching higher than 5 percent for a change in ambient temperature of 100° F.

Notwithstanding the complexity of the problem, it has been found that the temperature errors in a force-balance instrument can be reduced to acceptable levels in a very simple manner as will now be described. With continued reference to FIGURES 1 and 2, secured to the force-bar 10 is a small vertically-mounted plate 40. Extending through a hole in this plate is one end of a bimetallic rod 42 consisting of two bonded half-cylinders 42a and 42b (FIGURE 4) formed of materials having different temperature coefficients of expansion, e.g. silicon-bronze and Invar. The remote end of this rod is seated in a support member 44 which is rotatably mounted on a bracket 46. A pointer 48 on member 44 cooperates with a scale 50 on the bracket to provide a visual indication of the rotational position of rod 42.

Bimetallic elements such as rod 42 have been available and experimented with for many years. As is well known in the art of thermally-sensitive devices, if this type of rod is supported at one end, and unrestrained at its other end, a change in ambient temperature will cause the rod to bend transversely of the rod axis, forming a curved arc-like shape, due to the difference in longitudinal expansion (or contraction) of the two bonded segments 42a and 42b.

In the present invention, however, the rod 42 is so mounted that both ends are constrained. By these means, the rod is arranged to develop a force vector the magnitude of which is proportional to changes in ambient temperature. The direction of this force vector is perpendicular to the bond plane between the two segments 42a and 42b, and thus this direction can be altered by changing the rotational position of the rod. In the present invention, the direction of this vector controls the component of force which is applied as a torque to the force-bar 10. It has been found, surprisingly, that the temperature-dependent influence of this vector component can, by selecting the proper rotational position of the rod, be matched to the temperature characteristics of the instrument so as to reduce the temperature errors to acceptable levels.

Considering now the detailed construction of the preferred embodiment, the hole in the plate 40 is round and has a diameter only slightly greater than the diameter of the round rod 42 so as to permit free insertion of the rod. For example, the rod diameter may be .075" while the hole diameter may be .076". Since in this embodiment the rod does not fit snugly in the hole, the bracket 46 is shifted horizontally towards the rear of the instrument until the rod bears firmly against the side of the hole in the plate 40, as shown in FIGURE 3, and the bracket then is secured in this position by locking screws 52 (FIGURE 1). Initially, the rotational position of the rod is set as shown in FIGURES 5 so that the transverse force vector, resulting from say, an increase in temperature, passes directly through the flexure pivot axis 12 of the force-bar 10. In this rotational position, the variations in magnitude of the force vector due to changes in ambient temperature have no effect on the output signal of the transmitter.

While in this "zero compensation" position, a test is made to measure the amount of error for a given change in temperature (e.g. 100° F.) at the low end, the middle, and the high end of the instrument range. Thereafter, the rod 42 is rotated to a new position, e.g. as shown in FIGURES 6 or 7, at which the specific errors measured will be compensated by the temperature-sensitive torque produced by the force applied by the rod against the force-bar. Experience has shown that a rotational position can be found for the rod 42 which will reduce the errors to an acceptable level, for example no greater than one-half to one percent regardless of the range setting. For any given instrument design, it may be necessary initially to use cut-and-try techniques to determine the proper position for each instrument. However, more rapid procedures can readily be devised based on the measurements and settings found suitable for a large number of similar instruments. For example, a chart can readily be created to indicate the best setting of the pointer 48 for any temperature error measured with the pointer set for zero compensation and with the instrument set at the range which characteristically results in the maximum zero shift of the output signal for a given change in ambient temperature. Thus, only one set of temperature tests will need to be made, after which the pointer is positioned at the optimum setting, and the instrument shipped to the customer.

It can be seen from FIGURES 6 and 7 that the compensation provided can be either positive or negative, as required. In one compensator which was built and tested, any compensation in the range of plus-or-minus 7% could be provided. It is advantageous to apply the correcting force at a point near the flexure pivot 12 because the throttle band (i.e. the amount of force bar movement for a full scale change in input) is only a few millionths of an inch, and because proportionately large forces are involved. The rod 42 has essentially no effect on the "spring constant" of the system; this is advantageous because the presence of the rod therefore will not affect the sensitivity of the instrument.

Although a preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

I claim:

1. Temperature-compensated force-balance measuring apparatus for measuring an input force and comprising, in combination: a balanceable member adapted to receive the input force, support means mounting said member for movement in response to changes in said input force, means for applying a rebalance force to said member in opposition to said input force so as to prevent any significant motion of said member with respect to said support means, detection means associated with said balanceable member and operable to produce a feedback signal responsive to any unbalance of forces applied to said member, said rebalance means being controlled by said feedback signal so as to maintain a balance forces on said member whereby the magnitude of said feedback signal provides a measurement of said input force, bimetal means positioned to apply to said balanceable member a compensating force which varies with changes in ambient temperature while said bimetal means remains fixed in place, and means for shifting the position of said bimetal means to alter the vector component of the compensating force applied to said member and vary the influence of said bimetal means to provide a match thereof with the temperature characteristics of said apparatus.

2. Temperature-compensated force-balance measuring apparatus for measuring an input force and comprising, in combination: a chassis, a balanceable member adapted to receive the input force, support means secured to said chassis and mounting said member for movement in response to changes in said input force, means for applying a rebalance force to said member in opposition to said input force so as to prevent any significant motion of said member with respect to said support means, detection means associated with said balanceable member and operable to produce a feedback signal responsive to any unbalance of forces applied to said member, said rebalance means being controlled by said feedback signal so as to maintain a balance of forces on said member whereby the magnitude of said feedback signal provides a measurement of said input force, bimetal means having one end supported on said chassis and the other end in contact with said balanceable member to apply thereto a compensating force which varies with changes in ambient temperature while said bimetal means remains fixed in position, and means for rotating said bimetal means about an axis transverse to the direction of said force to alter the effective vector compensating force applied to said member in correspondence with the rotational position of said bimetal means, thereby to permit the influence of said bimetal means to be matched to the temperature characteristics of said apparatus.

3. Force-balance measuring apparatus for measuring an input force and comprising, in combination: an elongated balanceable member, pivot means supporting said member for pivotal movement about a transverse axis, said member being adapted to receive a transversely directed input force adjacent one end thereof tending to cause said member to rock about its pivot axis, motor means for applying a rebalance torque to said member in opposition to the torque produced by said input force so as to prevent any significant motion of said member about said pivot means, sensing means operable by said member and arranged to produce a feedback signal in response to any unbalance of torques applied to said member about said pivot axis, said motor means being controlled by said feedback signal so as to maintain a balance of torques on said member whereby the magnitude of said feedback signal provides a measurement of said input force, an elongated bimetallic element supported at one end and having its other end in contact with said member to apply thereto a compensating force which varies with changes in ambient temperature while said element remains in its position, and means for rotating said bimetallic element about its longitudinal axis to change the vector component of force applied perpendicularly to said balanceable member and alter the effective compensating torque applied to said member about said pivot axis, thereby to permit the influence of said bimetallic element to be matched to the temperature characteristics of said apparatus.

4. Force-balance measuring apparatus for measuring an input force and comprising, in combination, an elongated balance force-bar adapted to receive the input force, means supporting said force-bar for pivotal movement about an axis transverse to the longitudinal axis of said bar, motor means for applying a rebalance torque to said member in opposition to the torque produced by said input force so as to prevent any significant motion of said member about said pivot means, sensing means operable by said member and arranged to produce a feedback signal responsive to any unbalance of torques applied to said member about said pivot axis, said motor means being controlled by said feedback signal so as to maintain a balance of torques on said member whereby the magnitude of said feedback signal provides a measurement of said input force, a bimetallic rod consisting of two elongated segments bonded together along a plane to tend to produce a transverse bending motion in response to a change in temperature, support means mounting said rod at one end with its axis transverse to the axis of said force bar, the other end of said rod being engaged with said force-bar to apply thereto a compensating force which varies with changes in ambient temperature while said rod remains fixed in position, and means for rotating said bimetallic rod about its longitudinal axis to alter the effective compensating torque applied to said force-bar about said pivot axis, thereby to permit the influence of said bimetallic means to be matched to the temperature characteristics of said apparatus.

5. Apparatus as claimed in claim 4, wherein said bimetallic rod is mounted with its axis parallel to said pivot axis for said force-bar.

6. Apparatus as claimed in claim 4, including mounting plate means secured to said force-bar and formed with a hole through which said rod extends, said hole being round and providing a mating engagement with said rod in any rotational position thereof so as to receive the full compensating force thereof at any vector angle.

References Cited by the Examiner

UNITED STATES PATENTS

| 2,584,950 | 2/1952 | Weckerly | 177—226 X |
| 2,999,384 | 9/1961 | Johnson | 73—393 |

RICHARD C. QUEISSER, *Primary Examiner.*

CHARLES A. RUEHL, *Assistant Examiner.*